United States Patent [19]

Yallourakis

[11] 4,242,253

[45] Dec. 30, 1980

[54] LOW GLOSS POWDER COATING COMPOSITIONS

[75] Inventor: Michael D. Yallourakis, Wilmington, Del.

[73] Assignee: E. I. Du Pont de Nemours and Company, Wilmington, Del.

[21] Appl. No.: 45,414

[22] Filed: Jun. 4, 1979

[51] Int. Cl.³ ............................................... C08K 3/26
[52] U.S. Cl. ........................... 260/40 TN; 260/37 EP; 525/113; 525/934; 525/108
[58] Field of Search ............. 260/40 R, 40 TN, 37 N, 260/37 EP; 525/113, 934

[56] References Cited

U.S. PATENT DOCUMENTS

| | | | |
|---|---|---|---|
| 3,321,438 | 5/1967 | Brooker | 260/47 |
| 3,484,398 | 12/1969 | Childs | 260/18 |
| 3,647,726 | 3/1972 | Ulmer | 260/18 EP |
| 3,842,035 | 10/1974 | Klaren | 260/47 EN |
| 3,962,520 | 6/1976 | Watonabe | 525/113 X |
| 4,009,223 | 2/1977 | Noonan | 260/18 EP |
| 4,040,993 | 8/1977 | Elbling | 260/18 EP |
| 4,112,012 | 9/1978 | de Cleur | 260/40 R |
| 4,122,060 | 10/1978 | Yallourakis | 260/37 EP |
| 4,140,728 | 2/1979 | Hahn | 260/40 R |

FOREIGN PATENT DOCUMENTS 1381262  1/1975  United Kingdom ................... 525/934

OTHER PUBLICATIONS

"Degussa Flatting Agents".
"Resiflow P", Technical Data Sheet.
Scado Specification Sheet on "Uralac", P2400–P2450.
Veba–Chemie, "Hardener for Epoxy Resin Powders".
"Dow Experimental Hardener XD–8062".

*Primary Examiner*—Sandra M. Person

[57] ABSTRACT

A powder coating composition useful for coating metal substrates to provide a low gloss finish; the powder particles are a blend of
(a) a polyester or a blend of polyesters,
(b) an epoxy resin,
(c) triglycidyl isocyanurate,
(d) calcium carbonate pigment and
(e) finely divided polypropylene particles;
The composition is particularly useful for providing the interior of automobiles, station wagons and trucks with a low gloss finish.

10 Claims, No Drawings

LOW GLOSS POWDER COATING COMPOSITIONS

BACKGROUND OF THE INVENTION

Field of the Invention

This invention is related to powder coating compositions and in particular to a powder coating composition that provides a low gloss finish.

The automotive and truck manufacturing industry is in need of a nonairpolluting, low gloss durable coating composition for finishing the interior of trucks and automobiles in particular for the interior of station wagons. Conventional epoxy powder coating compositions provide finishes with a relatively high gloss and are not sufficiently resistant to fading caused by ultraviolet light. The novel powder coating composition of this invention provides a low gloss finish that is resistant to ultraviolet light.

SUMMARY OF THE INVENTION

A thermosetting powder coating composition of finely divided particles at least 90 percent by weight of which have a maximum particle size that do not exceed 100 microns; the particles are a blend of about (a) 14-64% by weight of a polyester or a blend of polyesters in which the polyester is the reaction product of a polyol and an aromatic polycarboxylic acid having a number average molecular weight of about 1,000-10,000 determined by gel permeation chromatography, (b) 5-18% by weight of an epoxy resin of the formula

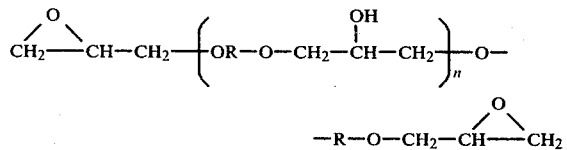

wherein n is a positive integer and R is an aromatic radical;

(c) 0.1-3% by weight of triglycidyl isocyanurate;

(d) 30-55% by weight of calcium carbonate pigment and (e) 0.9-10% by weight of finely divided polypropylene particles.

DETAILED DESCRIPTION OF THE INVENTION

The powder coating composition of this invention provides a low gloss finish useful for the interior of automobiles and trucks that is ultraviolet light resistant and does not fade. The coating composition is particularly useful for the interior and back of station wagons such as the floor panel, side panels and the interior of the rear door.

The powder coating composition has a powder particle size such that at least 90 percent by weight of the particles have a maximum dimension not exceeding 100 microns and preferably none has a maximum dimension exceeding 200 microns.

The film forming constituents of the powder coating composition are a polyester resin or a blend of polyester resins; an epoxy resin and triglycidyl isocyanurate. Calcium carbonate pigment and finely divided polypropylene particles provide the powder coating composition with its low gloss characteristics.

The polyester resin or a blend of polyester resins used in the coating composition is prepared from a polyol and an aromatic polycarboxylic acid. These resins have a number average molecular weight of about 1,000-10,000.

The number average molecular weight is determined by gel permeation chromatography using polyethylene terephthalate as the standard.

Typical aromatic polycarboxylic acids that can be used to prepare these polyester resins are phthalic acid, isophthalic acid, terephthalic acid, trimellite acid, trimellitic anhydride, pyromellitic acid, pyromellitic dianhydride, and other aromatic tetracarboxylic acids and the like.

Typical polyols that can be used to prepare the polyester are ethylene glycol, propylene glycol butanediol, neopentyl glycol, trimethylol propane, trimethylol butane, cyclohexane dimethanol, 2,2,4-trimethyl 1,3-pentanediol and the like.

Preferably, a blend of two polyester resins is used in an amount of about 24-53% by weight. One polyester resin of this blend is the reaction product of neopentyl glycol and terephthalic acid and has a number average molecular weight of about 2,000-5,000. The other polyester resin is the reaction product of neopentyl glycol, trimethylol propane and terephthalic acid and has a number average molecular weight of about 2,000-5,000.

These polyester resins are prepared according to conventional procedures well known in the art.

The powder coating composition contains an epoxy resin of the formula

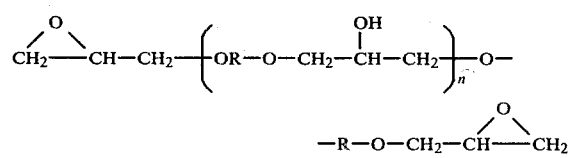

where n is a positive integer and R is an aromatic radical. The epoxy resin is used in the powder coating composition to enhance flow on baking to form a smooth finish.

Preferably, about 10-16% by weight of an epoxy resin of a epichlorohydrin-bisphenol A type is used that has the formula

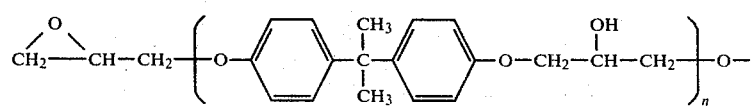

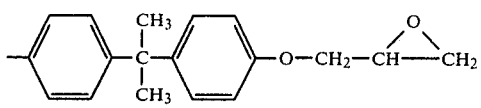

where n is sufficiently large to provide a resin having a Gardner-Holdt viscosity measured at 25° C. at 40% solids in diethylene glycol monobutyl ether of 50–150 and an epoxide equivalent weight of 400–750. The epoxide equivalent weight is the weight in grams of resin that contains one gram equivalent of epoxide.

The powder coating composition contains about 0.1–3% by weight and preferably about 1–2% by weight of triglycidyl isocyanurate for crosslinking the epoxy resin and polyester resin on curing.

To achieve a low gloss finish, the powder coating composition contains about 30–55% by weight and preferably 35–50% by weight of calcium carbonate pigment having a particle size of about 1–10 microns and about 0.9–10% by weight and preferably 1–8% by weight of finely divided polypropylene particles having a particle size of about 5–50 microns.

The powder coating composition in the form of a cured film about 1–3 mils thick has a gloss of less than 40 and usually about 15–30 measured at 60° according to ASTM D-1471-69

In addition to the aforementioned constituents, the powder coating composition can contain about 0.1–3% by weight of an ultraviolet light stabilizer. Typical ultraviolet light stabilizers are di[4(2,2,6,6-tetramethyl piperidinyl)]sebacate, benzotriazoles such as 2(2'hydroxy-5'-methylphenyl)benzotriazole, 3-(2'-hydroxy-3',5-di-t-butylphenyl)benzotriazole, 2-(3',5'-ditert-butyl-2'-hydroxyphenyl)5 chlorobenzotriazole, nickel bis[O-ethyl(3,5-ditert-butyl-4-hydroxy benzyl)]phosphonate and the like.

The powder coating composition can contain in addition to the above constituents about 0.5–4% by weight of a flow control agent such as a polyacrylate or polymethacrylate, fluorinated polymers such as esters of polyethylene glycol or polypropylene glycol, ethyl cellulose, silicones such as dimethyl polysiloxane or methyl phenyl polysiloxane. Benzoin which is alpha hydroxyphenolacetophenone is a useful flow control agent that reduces popping of the finish on baking.

The coating composition can contain in addition to the above constituents about 1–20% by weight of additional colorants and pigments. Any conventional organic or inorganic pigments and dyes can be used that will not change or break down under baking conditions and under manufactory conditions for making the powder coating. Examples of useful pigments are carbon black, metallic oxides such as zinc oxide, iron oxide, titanium oxide, filler pigments such as silica, barium sulfate, aluminum silicate, "Monastral" red and green pigments, "Thiofast" red pigment, and the like.

One preferred powder coating composition contains about

24–53% by weight of a blend of polyester resins of a polyester of neopentyl glycol/terephthalic acid having a number average molecular weight of about 2,000–5,000; and a polyester of neopentyl glycol/trimethylol propane/terephthalic acid having a number average molecular weight of about 2,000–5,000;

10–16% by weight of an epoxy resin of the formula

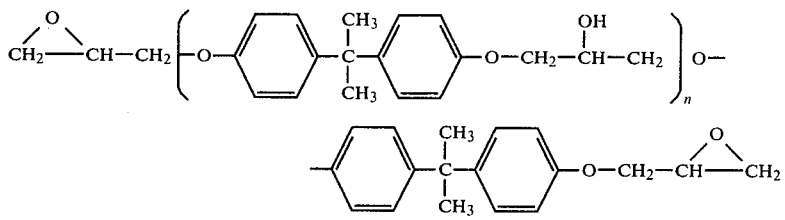

wherein n is sufficiently large to provide a resin having a Gardner-Holdt viscosity measured at 25° C. at 40% solids in diethylene glycol monobutyl ether of 50–150 and an epoxide equivalent weight of 400–750;

1–2% by weight of triglycidyl isocyanurate;

35–50% by weight of calcium carbonate; and

1–8% by weight of finely divided polypropylene particles.

One method for forming the powder coating composition is to blend the components together and then to pass the mixture through a conventional melt-extruder. The extrudate is cooled and can then be reduced to a powder using conventional grinding equipment. After grinding, the powder is passed through a standard mesh screen to remove large particles. Preferably, a sieve that eliminates particles having maximum particle size greater than 100 microns is used.

The powder coating composition can be applied directly to a metal or steel substrate or to one which has been primed with, for example, a conventional cathodic or anodic electrodeposition primer. Application can be by using electrostatic spraying techniques or by using a fluidized bed which can be electrostatic. The preferable method is electrostatic spraying in which, for example, a voltage of 20–100 kilovolts is applied to the spray gun. The composition can be applied either in one pass or in several passes to provide variable thicknesses, after cure, of about 0.5–5 mils, preferably 1–3 mils. The substrate to be coated can, optionally, be heated to any temperature up to 175° C. prior to the application of the powder. Preheating the article provides better powder deposition and allows for higher film thickness.

After the application of the powder, the powder-covered article is heated at 150°–200° C. for 5–45 minutes to fuse and to cure the powder particles into a substantially continuous, uniform film.

The primary use of the powder coating composition is for the interior of automobiles, station wagons and trucks but can also be used in a variety of other areas where a low gloss, durable finish is desired. It can be used on office equipment such as file cabinets, typewriters, mimeograph machines and on metal furniture.

The following examples illustrate the invention. All parts and percentages are on a weight basis unless otherwise indicated. Molecular weights are determined by gel permeation chromatography. Mn is the number average molecular weight and Mw is the weight average molecular weight.

EXAMPLE 1

A powder coating composition is prepared as follows:

| Portion 1 | Parts By Weight |
|---|---|
| Polyester resin I (linear carboxyl terminated neopentyl glycol/terephthalic acid polyester having a Mn 3600, Mw 15,000 and a melting point of 90–100° C.) | 21.30 |
| Polyester resin II (branched carboxyl terminated neopentyl glycol/trimethylol propane/terephthalic acid polyester having a Mn 3600, Mw 15,000 and a melting point of 90–100° C.) | 10.60 |
| Triglycidyl isocyanurate | 0.80 |
| Epoxy Resin having the formula | 11.80 |

$$CH_2-CH-CH_2 \left( -O-\underset{CH_3}{\underset{|}{\overset{CH_3}{\overset{|}{C}}}}-O-CH_2-CH-CH_2 \right)_n -O-$$

$$-\underset{CH_3}{\underset{|}{\overset{CH_3}{\overset{|}{C}}}}-O-CH_2-CH-CH_2$$

where n is sufficiently large to provide a resin having a Gardner-Holdt viscosity measured at 25° C. at 40% solids in diethylene glycol monobutyl ether of 70–80 and an epoxide equivalent weight of 475–575.

| Portion 2 | Parts By Weight |
|---|---|
| Benzoin | 1.30 |
| Flow Control Agent (acrylic resin flow control agent) | 2.20 |
| Ultraviolet light stabilizer-di[4(2,2,6,6-tetramethyl piperidinyl)]sebacate | 0.90 |
| "Thiofast" Red Pigment | 0.94 |
| Precipitated Iron Oxide Pigment | 1.80 |
| "Monstral" Red Pigment | 1.46 |
| Calcium Carbonate Pigment | 42.10 |
| Antimar Agent (finely divided polytetrafluoroethylene powder having a particle size of 1–5 microns) | 1.80 |
| Polypropylene Particles (particle size of about 35 microns) | 3.00 |
| Total | 100.00 |

Portion 1 is charged into a Welex grinder-mixer and mixed for 30 seconds. Portion 2 is then added and mixing is continued for one minute. This blend is then charged into a melt extruder and extruded at about 60°–70° C. The extrudate is chilled, broken into chips, and then charged into a grinding mill where it is ground to a fine powder. The powder is then passed through a standard 200-mesh screen to remove particles of maximum dimension greater than 75 microns.

The powder is sprayed as a primer onto 20-gauge iron phosphate treated steel panels using Ransburg electrostatic powder gun, and the coated panels are then heated in a gas-fired oven for approximately 15 minutes at 182° C. The resultant cured coating has a thickness of 2.5 mils.

The resulting coating has the following properties:
Gloss measured at 60°—20-25
Fade-O-Meter Resistance—excellent (200 hours exposure)
Impact Resistance (Front)—160 inch pounds
Salt Spray Resistance—passed 1000 hours exposure
Tukon Hardness Test—15-18 knoops
Block Resistance—excellent
 (coated panels face to face at 80° C. for 30 minutes)
Resistance to wear—Excellent
 (Tabor abrasion—500 cycles with 50 g load)
Adhesion to substrate—Excellent
 (100% Relative Humidity for 24 hours ambient room temperature)
Cold crack resistance—24 inch pounds impact resistance.
 (−20° C.)

The above properties of the powder coating composition make the composition acceptable for use in the interior of automobiles, particularly for the interior of station wagons.

EXAMPLE 2

A powder coating composition is prepared as follows:

| Portion 1 | Parts By Weight |
|---|---|
| Polyester resin I (described in Example 1) | 21.44 |
| Polyester resin II (described | 10.70 |

-continued

| | Parts By Weight |
|---|---|
| in Example 1) | |
| Triglycidyl isocyanurate | 0.90 |
| Epoxy Resin (described in Example 1) | 12.00 |
| Portion 2 | |
| Benzoin | 1.50 |
| U.V. Light Stabilizer (described in Example 1) | 1.00 |
| Flow Control Agent (described in Example 1) | 2.50 |
| "Thiofast" Red Pigment | 1.23 |
| Precipitated Iron Oxide pigment | 2.51 |
| "Monastral" Red Pigment | 2.22 |
| Calcium Carbonate Pigment (described in Example 1) | 35.00 |
| Polypropylene Particles (described in Example 1) | 7.50 |
| Antimar Agent (described in Example 1) | 1.50 |
| Total | 100.00 |

The components are charged into a Welex grinder-mixer and mixed for 60 seconds. The mix is then charged into a melt extruder and extruded at about 60°–70° C. The extrudate is chilled, broken into chips, and then charged into a grinding mill where it is ground to a fine powder. The powder is then passed through a standard 200-mesh screen to remove particles larger than about 75 microns.

As in Example 1, the powder is sprayed onto 20-guage iron phosphate treated steel panels and baked. The resulting coating has a thickness of about 2.5 microns.

The physical properties of the above coating are about the same as in Example 1.

I claim:

1. A thermosetting powder coating composition consisting essentially of finely-divided particles at least 90 percent by weight of which have a maximum particle size not exceeding 100 microns; wherein the particles comprise a blend of about
   (a) 14–64% by weight of a polyester or a blend of polyesters of polyol and an aromatic polycarboxylic acid having a number of average molecular weight of about 1,000–10,000 determined by gel permeation chromatography;
   (b) 5–18% by weight of an epoxy resin of the formula $$\underset{CH_2\!-\!\!-\!\!-\!CH\!-\!CH_2}{\overset{O}{\diagup\diagdown}}\!\left[\!OR\!-\!O\!-\!CH_2\!-\!\underset{OH}{\overset{|}{CH}}\!-\!CH_2\!\right]_n\!\!\!-\!O-$$
$$-R\!-\!O\!-\!CH_2\!-\!\underset{CH_2\!-\!\!-\!\!-\!CH\!-\!\!-\!\!-\!CH_2}{\overset{O}{\diagup\diagdown}}$$

where n is a positive integer and R is an aromatic radical;
   (c) 0.1–3% by weight of triglycidyl isocyanurate;
   (d) 30–55% by weight of calcium carbonate pigment and
   (e) 0.9–10% by weight of finely divided polypropylene particles.

2. The powder coating composition of claim 1 containing in addition to the above constituents about 0.1–3% by weight of an ultraviolet light stabilizer.

3. The powder coating composition of claim 1 containing in addition to the above constituents about 1–20% by weight of additional colorants and pigments.

4. The powder coating composition of claim 1 containing in addition to the above constituents about 0.5–4% by weight of a flow control agent.

5. The coating composition of claim 2 in which R of the epoxy resin is $$\underset{\phantom{xx}}{\diagup\!\!\!\diagdown}\!\!-\!\underset{\underset{CH_3}{|}}{\overset{\overset{CH_3}{|}}{C}}\!\!-\!\underset{\phantom{xx}}{\diagup\!\!\!\diagdown}$$

6. The powder coating composition of claim 5 wherein the particles comprise about
   (a) 24–53% by weight of a blend of polyester resins comprising
      (1) a polyester of neopentyl glycol/terephthalic acid having a number average molecular weight of about 2,000–5,000; and
      (2) a polyester of neopentyl glycol/trimethylol propane/terephthalic acid having a number average molecular weight of about 2,000–5,000;
      wherein the molecular weights are determined by gel permeation chromatography;
   (b) 10–16% by weight of an epoxy resin of the formula $$\underset{CH_2\!-\!\!-\!\!-\!CH\!-\!CH_2}{\overset{O}{\diagup\diagdown}}\!-\!O\!-\!\!\underset{\phantom{x}}{\diagup\!\!\!\diagdown}\!\!-\!\underset{\underset{CH_3}{|}}{\overset{\overset{CH_3}{|}}{C}}\!\!-\!\underset{\phantom{x}}{\diagup\!\!\!\diagdown}\!-\!O\!-\!CH_2\!-\!\underset{OH}{\overset{|}{CH}}\!-\!CH_2\right)_n\!O-$$
$$-\!\underset{\phantom{x}}{\diagup\!\!\!\diagdown}\!\!-\!\underset{\underset{CH_3}{|}}{\overset{\overset{CH_3}{|}}{C}}\!\!-\!\underset{\phantom{x}}{\diagup\!\!\!\diagdown}\!-\!O\!-\!CH_2\!-\!\underset{CH_2\!-\!\!-\!\!-\!CH\!-\!\!-\!\!-\!CH_2}{\overset{O}{\diagup\diagdown}}$$

wherein n is sufficiently large to provide a resin having a Gardner-Holdt viscosity measured at 25° C. at 40% solids in diethylene glycol monobutyl ether of 50–150 and an epoxide equivalent weight of 400–750;
   (c) 1–2% by weight of triglycidyl isocyanurate;
   (d) 35–50% by weight of calcium carbonate pigment and
   (e) 1–8% by weight of finely divided polypropylene particles.

7. The powder coating composition of claim 6 containing in addition to the above constituents about 0.1–3% by weight of an ultraviolet light stabilizer.

8. The powder coating composition of claim 6 containing in addition to the above constituents about 1–20% by weight of additional colorants and pigments.

9. The powder coating composition of claim 6 containing in addition to the above constituents about 0.5–4% by weight of acrylic polymer flow control agent.

10. A substrate coated with a 0.5–5 mil thick layer of the cured coating composition of claim 1.

* * * * *